(12) United States Patent
Cheriere et al.

(10) Patent No.: US 8,996,340 B2
(45) Date of Patent: Mar. 31, 2015

(54) METHOD, DEVICES AND COMPUTER PROGRAM FOR ASSISTING IN THE DIAGNOSTIC OF AN AIRCRAFT SYSTEM, USING FAILURE CONDITION GRAPHS

(75) Inventors: Vincent Cheriere, Montastruc la Conseillere (FR); Christophe Abelin, Le Gres (FR); Jeremy Roger, Toulouse (FR); Laia Vilalta-Estrada, Fontenilles (FR)

(73) Assignees: Airbus S.A.S., Blagnac (FR); Airbus Operations S.A.S., Toulouse (FR)

( * ) Notice: Subject to any disclaimer, the term of this patent is extended or adjusted under 35 U.S.C. 154(b) by 207 days.

(21) Appl. No.: 13/276,632

(22) Filed: Oct. 19, 2011

(65) Prior Publication Data

US 2012/0101793 A1    Apr. 26, 2012

(30) Foreign Application Priority Data

Oct. 22, 2010 (FR) ..................... 10 04161

(51) Int. Cl.
*G06F 7/60* (2006.01)
*G06F 11/07* (2006.01)
*G05B 23/02* (2006.01)

(52) U.S. Cl.
CPC .......... *G06F 11/079* (2013.01); *G05B 23/0248* (2013.01); *G06F 11/0739* (2013.01); *G06F 11/0748* (2013.01)
USPC .......................................................... 703/2

(58) Field of Classification Search
CPC . G06F 11/0739; G06F 11/079; G06F 11/008; G06F 11/0748; G06F 11/0781; G05B 23/0248; G05B 23/0272; B64F 5/0081; G06Q 10/0635; G07C 5/0808; G07C 5/085; G07C 5/0816

USPC .................................................................. 703/2
See application file for complete search history.

(56) References Cited

U.S. PATENT DOCUMENTS 7,230,527 B2 * 6/2007 Basu et al. ..................... 340/506
8,457,811 B2 * 6/2013 Gaudan et al. .................. 701/14

(Continued)

FOREIGN PATENT DOCUMENTS

FR    2 927 435           8/2009
WO   WO 03/032249 A1    4/2003

OTHER PUBLICATIONS

Manders et al. ("Signal Interpretation for Monitoring and Diagnosis, A Cooling System Testbed", IEEE, 2000).*

(Continued)

*Primary Examiner* — Omar Fernandez Rivas
*Assistant Examiner* — Iftekhar Khan
(74) *Attorney, Agent, or Firm* — Oblon, McClelland, Maier & Neustadt, L.L.P.

(57) ABSTRACT

A diagnostic system of an aircraft, comprising a plurality of sub-systems at least one of which performs monitoring and notification of at least one detected event, using graphs of feared events. After a message of notification of occurrence of the detected event has been received, a set of feared events linked to this message is created from the graph of feared events, and logic expressions are constructed according to logic links represented in the graph of feared events. A group of feared events then is created according to elements of the logic expressions. The minimal vertexes of the logic expressions associated with the feared events of the group are calculated and form a diagnosis of the system.

19 Claims, 9 Drawing Sheets

(56) References Cited

U.S. PATENT DOCUMENTS

| | | | |
|---|---|---|---|
| 2003/0070108 A1 | 4/2003 | Groen et al. | |
| 2005/0065753 A1* | 3/2005 | Bigus et al. | 702/186 |
| 2006/0195302 A1 | 8/2006 | Fijany et al. | |
| 2007/0028220 A1* | 2/2007 | Miller et al. | 717/124 |
| 2008/0065281 A1* | 3/2008 | Tran | 701/3 |
| 2008/0249678 A1* | 10/2008 | Bailly et al. | 701/29 |
| 2008/0312783 A1* | 12/2008 | Mansouri et al. | 701/29 |
| 2009/0112379 A1* | 4/2009 | Geiter | 701/3 |
| 2009/0210104 A1 | 8/2009 | Bernard et al. | |
| 2010/0049379 A1* | 2/2010 | Vial | 701/3 |
| 2013/0197721 A1* | 8/2013 | Gu et al. | 701/3 |

OTHER PUBLICATIONS

Michael Stamatelatos, et al., "Fault Tree Handbook with Aerospace Applications", NASA Office of Safety and Mission Assurance, XP-002620316, Aug. 2002, 218 pages.

French Preliminary Search Report issued Feb. 4, 2011, in French 1004161, filed Oct. 22, 2010 (with English Translation of Categories of Cited Documents).

* cited by examiner

METHOD, DEVICES AND COMPUTER PROGRAM FOR ASSISTING IN THE DIAGNOSTIC OF AN AIRCRAFT SYSTEM, USING FAILURE CONDITION GRAPHS

This invention relates to the diagnosis of elements of complex, especially aircraft, systems, and more particularly to a method, devices and a computer program for aid in diagnosis of a system of an aircraft, using graphs of feared events.

The latest systems for diagnosis of failures in aircraft generally use failure models worked out by the manufacturers and their parts suppliers during the development cycle of the aircraft.

For certain manufacturers, these models are worked out mainly by the parts suppliers that develop systems for monitoring their equipment items, comprising self-diagnosing software applications, also called "Built-In Test Equipment" (BITE) in English terminology, conveying maintenance messages applying to equipment items suspected of being out of order as soon as the monitoring systems detect them. A software application of a centralized maintenance system, called CMS (abbreviation for Centralized Maintenance System in English terminology) collects and consolidates these maintenance messages in order to identify the most relevant maintenance messages enabling the ground maintenance crews to successfully carry out repairs. Such systems typically use the ARINC standard 604 (standard applying to the design and implementation of integrated test equipment items).

For other manufacturers, the diagnosis system for an aircraft is a system using failure models implemented in the centralized maintenance system. Thus, for example, in the article entitled "*Application of model-based diagnostic technology on the Boeing 777 Airplane*," 1994, the author, Tim Felke, indicates that the centralized maintenance system uses an abductive diagnosis algorithm with cause-to-effect relationships implemented in the model.

These models may use information items transferred by a communication network connecting several systems of an aircraft, called Inter-Communication Data (ICD) in English terminology. They comprise a knowledge of the signals exchanged among the systems.

There also are broader modeling methods which are not based solely on data exchanges via a communication network.

Furthermore, it is seen that on modern aircraft, the on-board systems cooperate significantly. They exchange data via communication buses, for example buses in accordance with the standards ARINC 429 or AFDX (abbreviation for Avionics Full DupleX in English terminology), power, in particular electric, hydraulic and mechanical power, or other services such as ventilation. Most of these interdependencies and the failures that they cause when they are faulty generally are not formalized in the diagnosis systems of present-day aircraft.

By way of illustration, the diagnosis systems of certain modern aircraft rely on the use of logic rules which have the purpose of consolidating messages sent by various avionic systems to the centralized maintenance system. Such logic rules, however, are drawn up empirically by experts. Thus there is no means of formal validation. Moreover, such an approach does not make it possible to formally calculate design operating features such as the coverage of failure detection, the coverage of diagnosis of failures critical for the safety or operational availability of the aircraft.

The diagnosis systems used on other aircraft reason from models implemented in centralized relational databases which contain cause-to-effect relationships between the messages sent by separate systems. The dependence among the systems from the viewpoint of their failures, however, is not formalized here, which does not enable an understanding of series of physical or functional events that may take place in an aircraft. This is one of the reasons for which a step of correlation with cockpit effects, for example EICAS (acronym for Engine Indicating and Crew Alerting System in English terminology) messages, of diagnosis algorithms used in these aircraft is performed on the basis of empirical logic rules.

Thus, in view of the foregoing, there are needs for systems for aid in diagnosis making it possible to establish a coherence between a model used by the maintenance system and a model used for conducting safety studies, also being able to serve to justify needs for alerts in a cockpit and to carry out analyses of MSG-3 type (abbreviation for Maintenance Steering Group-3 in English terminology) used for drawing up Scheduled Maintenance Manuals for an aircraft. There also are needs for systems for aid in diagnosis making it possible to establish a coherence between a model used by a maintenance system and a model used for drafting the documentation of an aircraft, in particular documents known under the names of trouble-shooting manual and aircraft maintenance manual. Moreover, there are needs for automatism in impact analysis during the development of equipment items of an aircraft (functionalities or failure modes). Such analyses may be performed manually nowadays, but the task is lengthy and the result may be incomplete. The reasoning of the algorithm for aid in diagnosis preferably should be coherent with the minimal sections identified by the FMEA (abbreviation for Failure Modes and Effects Analysis in English terminology) and the link between the diagnosis aid result and the minimal list of equipment items known under the name of MMEL (abbreviation for Master Minimum Equipment List in English terminology). Moreover, the reasoning of the algorithm for aid in diagnosis preferably should be coherent, in real time, with the procedure for management of problems carried out on the ground and the reasoning should be proved logically in order to determine the relationship among the failures and their effects on the aircraft (ECAM/EICAS messages, audio alerts, suspicious odors, suspicious noise, etc.).

The invention makes it possible to resolve at least one of the problems set forth above.

The invention thus has as an object a computer method for establishing an aid in diagnosis of a complex system of an aircraft comprising a plurality of sub-systems, at least one sub-system of the said plurality of sub-systems comprising means for monitoring and notification of at least one detected event, this method using a graph of feared events at least partially modeling the said complex system, the said graph of feared events comprising a plurality of peaks, each peak of the said plurality of peaks being connected by a logic implication relationship to at least one other peak of the said plurality of peaks, the said plurality of peaks comprising at least, one peak representing a feared event; and,
one peak representing at least one element of the said complex system,
the said at least one element being able to break down;
and the method comprising the following steps,
receiving at least one message of notification of occurrence of the said at least one detected event;
creating a set of feared events, each feared event of the said set of feared events being associated with a peak of the said graph of feared events linked to the said at least one notification message received;
for each feared event of the said set of feared events, constructing, from the said graph of feared events, at least one logic expression leading to the said feared event, the said at least one logic expression being based on elements of the said complex system;

creating at least one group of feared events of the said set of feared events, at least one element being common to two logic expressions linked to two separate feared events of the said at least one group, the logic expressions associated with the said feared events of the said at least one group representing a diagnosis relating to the said at least one detected event.

In this way the method according to the invention makes it possible to establish a diagnosis of a complex system of an aircraft from standard messages of notification of detected events by using a modeling of the system which furthermore may be used to perform verifications and to conduct analyses relating to the complex system.

The method advantageously further comprises a step of determining minimal vertexes of the logic expressions of the feared events of the said at least one group, the said minimal vertexes forming minimal diagnoses of the said diagnosis relating to the said at least one detected event. In this way the diagnosis obtained is directly usable, in particular by a maintenance operator.

According to a specific embodiment, the said graph of feared events further comprising at least one peak representing a message associated with the said at least one detected event, the method further comprising a step of identifying, in the said graph of feared events, at least one peak representing a message according to the said at least one received message, each feared event of the said set of feared events being associated with a peak of the said graph of feared events linked to the said at least one notification message via the said at least one identified peak. In this way the graph of feared events forms a modeling of the complex system able to be used autonomously.

The method preferably further comprises a step of displaying, storing and/or transmitting the said diagnosis relating to the said at least one detected event.

Still according to a specific embodiment, the said graph of feared events comprises at least one sub-graph of feared events, the said at least one sub-graph of feared events at least partially modeling a sub-system of the said plurality of sub-systems. In this way the modeling of the complex system may be easily achieved and maintained.

The said graph of feared events advantageously further comprises at least one peak representing a logic operation, at least one of the said logic operations comprising a logic operation represented by a peak of the graph of feared events. In this way the method according to the invention makes it possible to handle multiple failures occurring in combination.

The invention also has as an object a computer program comprising instructions adapted for the implementation of each of the steps of the method described above, when the said program is run on a computer. The advantages obtained with this computer program are similar to those indicated above.

The invention also has as an object a maintenance system for an aircraft comprising a computer comprising means for implementing each of the steps of the method described above, making it possible to establish a diagnosis directly in the aircraft, in real time.

The maintenance system advantageously further comprises means for transmitting the said diagnosis to a distant system. In this way it is possible to anticipate actions to be undertaken, in particular maintenance operations.

The invention also has as an object an aircraft comprising the system described above. The advantages obtained with this aircraft are similar to those indicated above.

The invention likewise has as an object a data processing system comprising means for receiving information items relating to at least one message of notification of occurrence of at least one event detected by monitoring and notification means of a sub-system of a complex system of an aircraft comprising a plurality of sub-systems and a computer comprising means for implementing each of the steps of the method described above. In this way, it is possible, on the ground, to establish a diagnosis of a complex system of a distant aircraft, making it possible to anticipate actions to be undertaken, in particular maintenance operations.

Other advantages, purposes and characteristics of this invention become apparent from the detailed description that follows, presented by way of non-limitative example, with reference to the attached drawings in which:

FIG. 6, comprising

In general, the invention applies to a system for aid in diagnosis of an aircraft system, using graphs of feared events (or failure condition graph in English terminology), here constructed from failure trees (called fault tree in English terminology) developed during safety studies.

Figure 1:
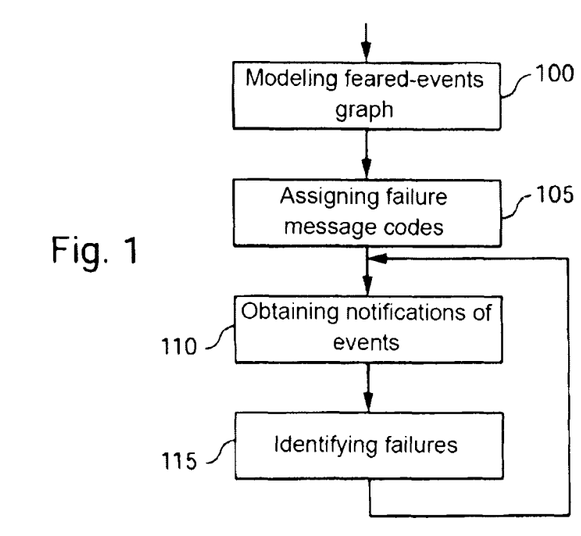
FIG. 1 schematically shows certain steps of the method according to the invention for establishing an aid for diagnosis of a system of an aircraft.

As illustrated on FIG. 1, the general method here is broken down into four phases. A first phase (phase 100) applies to the modeling of a graph of feared events. An example of such a modeling is described with reference to FIGS. 2 and 3. A second phase (phase 105) has as an object the assignment of failure message codes to the graph of feared events modeled beforehand. A third phase (phase 110) consists in obtaining, in real time or in batch mode, notifications of detections of events transmitted by monitoring systems of the aircraft. Finally, in a fourth phase (phase 115), a failure identification algorithm is run by a machine, preferably automatically, to provide an aid in diagnosis of the aircraft from detected events and from the modeled graph of feared events. As illustrated, the last two phases preferably are repeated in order to allow analysis of all the detected events, for example as they are detected.

According to a specific embodiment, the modeling of the graph of feared events is produced from modelings of graphs of feared events for several, preferably all, systems of an aircraft. The graph of feared events may be regarded as the extension of the failure trees developed during safety studies. Here it has the following characteristics:

the graph is directed, it may comprise cycles;

the graph comprises at least three types of peaks:

blamable objects designating equipment items, preferably replaceable, in particular computers of LRU (abbreviation for Line Replaceable Unit in English terminology) type, software applications, cables and operating conditions such as zero-resetting (reset) of an equipment item displaying a malfunction or exceptional operating conditions of a system (such as, for example, an engine over-revving, a skidding on braking or an operation in the presence of ice on the air inlets);

feared events, called failure condition in English terminology, designating failure conditions of the system modeled by the graph; and, logic gates designating logic operations, for example the logic operations OR, AND, negation (NEG) or a gate of "n AMONG" type (where n is a non-zero natural integer representing an activation threshold);

each arc of the graph is a directed arc representing a logic implication relationship between the two peaks that it connects, the origin of the arc being able to be regarded as a cause and the destination an effect;

the set of peaks of the graph covers all the fault trees of the AMDEC (acronym for Analyse des Modes de Défaillance, de leurs Effets et de leur Criticité [Analysis of Failure Modes, their Effects and their Criticality]) analysis made for safety analysis (system safety analysis or FMEA system). In other words, any fault tree shown in the FMEA system is a sub-graph of the graph of feared events;

the set of blamable-object type peaks comprises all the replaceable units or modules (LRU and LRM, abbreviation for Line Replaceable Module in English terminology) considered in the maintenance manuals known under the names of TSM and AMM; and, the set of functional failures (Functional Failures) defined in the MSG-3 type analysis of the system considered is included in the set of feared-event type peaks of the graph.

The graph of feared events may comprise thousand peaks and arcs.

It is to be noted that a graph may have a variable degree of completeness. For example, the blamable objects linked to the wiring may not appear in an intentionally simplified version of the graph of a system. Nonetheless, this simplified graph makes possible a first diagnosis level worthwhile for on-line maintenance and allows an embodiment where the manufacturer offers a detailed diagnosis service based on a complete graph.

Figure 2:
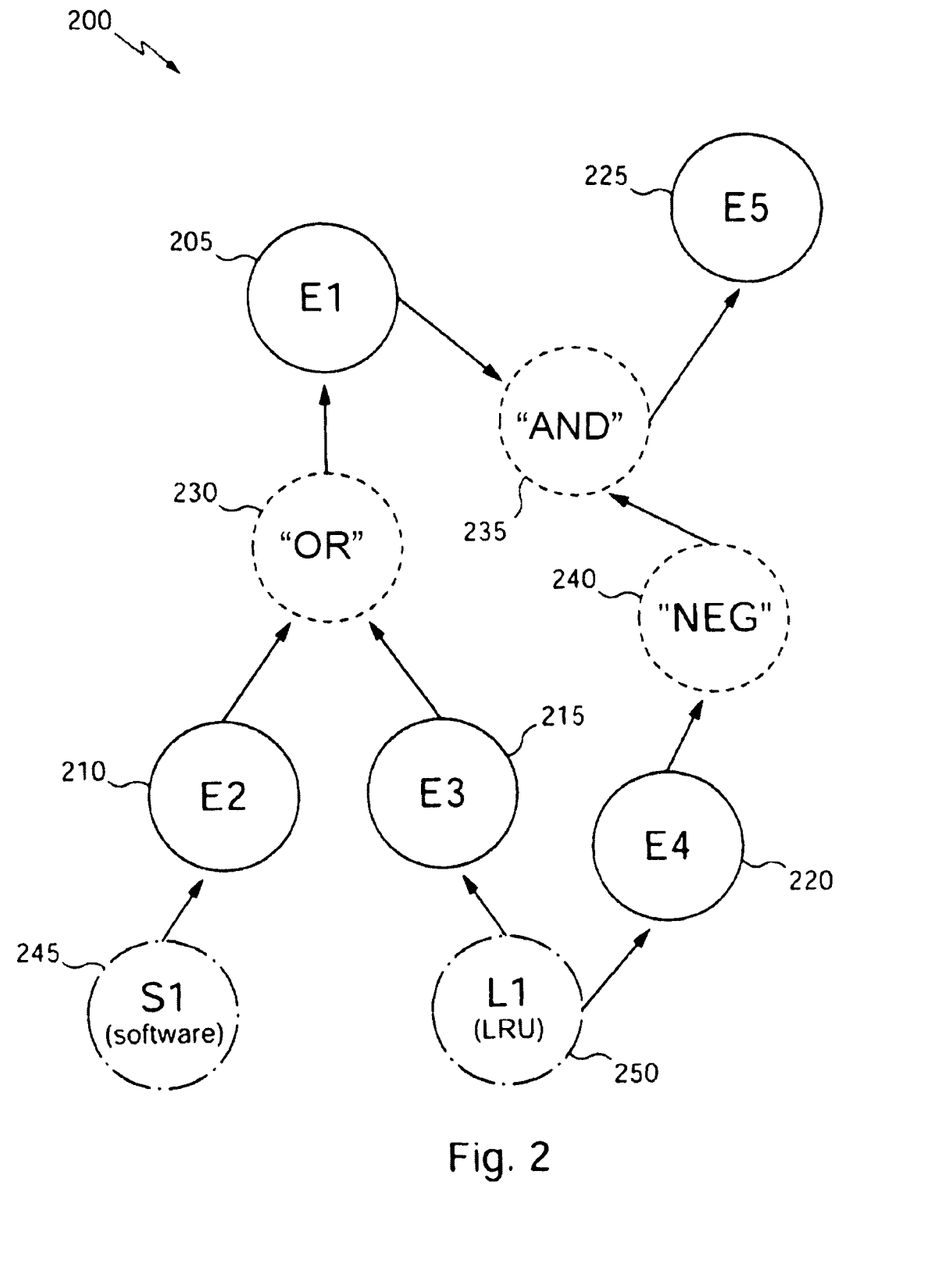
FIG. 2 illustrates an exemplary graph of feared events.

FIG. 2 illustrates an example of such a graph of feared events 200. The circles here represent the peaks of the graph of feared events while the arrows represent the arcs of the graph. Circles 205 to 225, in a continuous line, represent feared-event type peaks, circles 230 to 240, in a dotted line, represent logic-gate type peaks and circles 245 and 250, in a variable-length dotted line, represent blamable-object type peaks. Thus, for example, a fault in equipment item S1 (245), here a software application, is able to trigger feared event E2 (210). Likewise, a fault in equipment item L1 (250), here an LRU, is able to trigger feared event E3 (215). Moreover, the triggering of feared event E2 (210) or feared event E3 (215) leads to triggering of feared event E1 (205) in accordance with logic gate OR (230) connecting feared events E2 and E3 to feared event E1.

Figure 3:
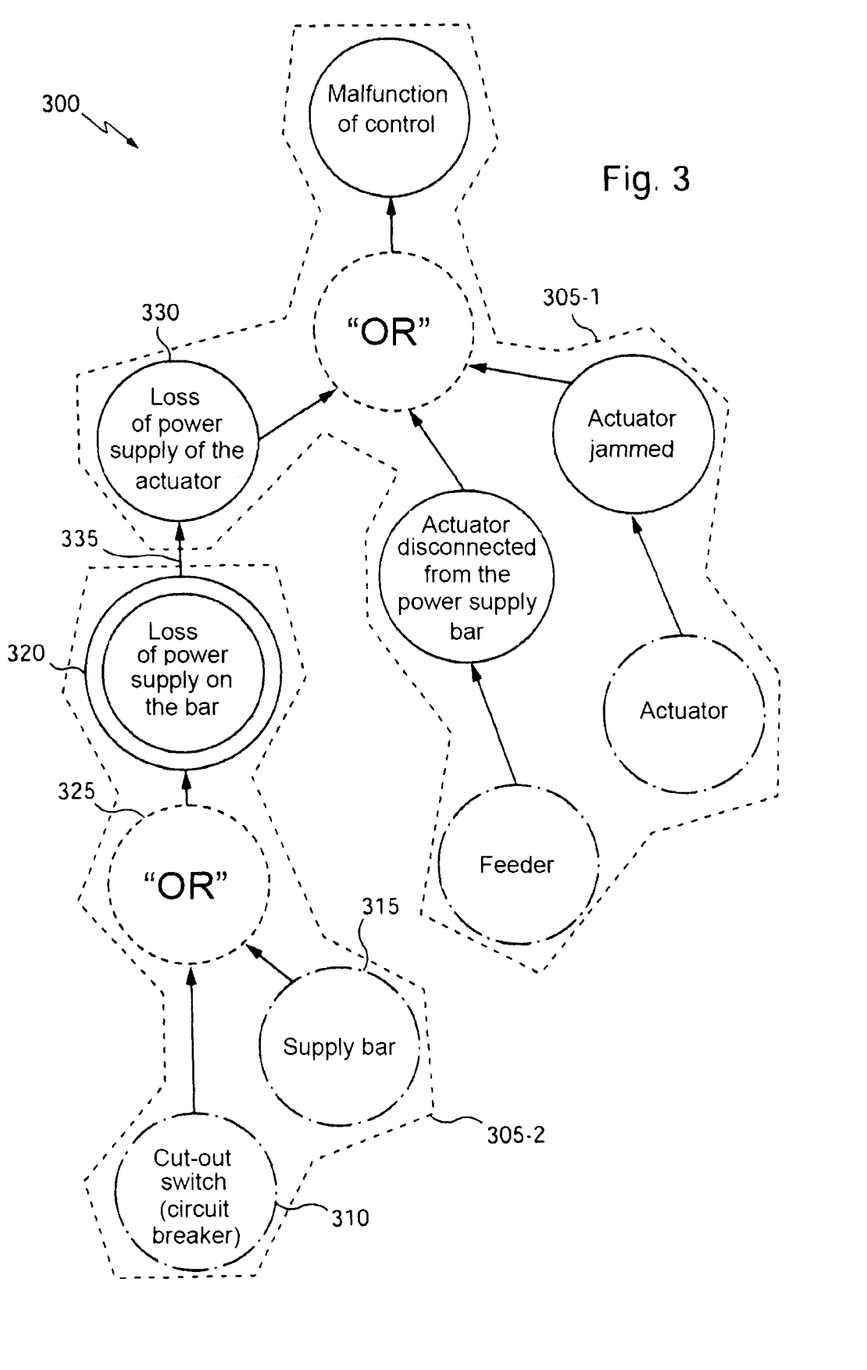
FIG. 3 illustrates an exemplary graph of feared events linked to two systems each represented by a separate sub-graph of feared events.

Each sub-system of a system may be represented by a sub-graph of feared events. In this way, when a graph of feared events is linked to a system comprising several sub-systems, each sub-system being linked to a sub-graph of feared events, there are, in the graph of feared events, feared-event type peaks that serve as interface between the sub-graphs of feared events, representing cause-to-effect relationships between the corresponding sub-systems. Such peaks preferably are identified with a specific attribute. FIG. 3 illustrates an exemplary graph of feared events 300 linked to two sub-systems, here an actuator type sub-system and a power-supply type sub-system, each represented by a separate sub-graph of feared events referenced 305-1 and 305-2, respectively.

Again, the circles represent peaks of the graphs of feared events and the arrows represent the arcs of the graph. The circles in a continuous line represent feared-event type peaks, the circles in a dotted line represent logic-gate type peaks and the circles in a variable-length dotted line represent blamable-object type peaks. The circle in a double continuous line represents a feared-event type peak serving as interface between two systems.

By way of illustration, the detection of a fault in cut-out switch 310 or in supply bar 315 is a cause of the feared event "loss of power supply on the bar" (320), in accordance with logic gate OR (325), in the sub-graph of feared events 305-2. Since the feared event "loss of power supply on the bar" (320) is a peak serving as interface between sub-graphs 305-1 and 305-2, it is the cause of the feared event "loss of power supply of the actuator" (330) in the sub-graph of feared events 305-1 in accordance with arc 335.

The advantages of such a representation in the form of a graph of feared events are linked in particular to the coherence thereof with models used for conducting safety analyses, which makes it possible, with the same formalism, to represent a knowledge of a system, a high-level feared event up to a feared event at the level of a component of the system and, in this way, to bring together in a sole database the knowledge of parts suppliers and a manufacturer. It also allows establishment of a formal proof, using the theory on coverage of graphs, that the feared events are, from a safety point of view, well covered by the graph of feared events used in the system for aid in diagnosis.

After a graph of feared events has been modeled, a following phase (phase 105 of FIG. 1) is intended to identify relationships between feared events represented in the graph of feared events and feared events that may be detected in real time by monitoring systems (BITE) of systems of the aircraft to which the graph of feared events is linked. The detected events are, for example, notified by messages transmitted by the corresponding monitoring systems.

A maintenance message, a fault report, a monitoring parameter of the ACMF (abbreviation for Aircraft Condition Monitoring Function in English terminology) function, a message of ECAM (abbreviation for Electronic Centralised Aircraft Monitor in English terminology) type or an alert from the FWS (abbreviation for Flight Warning System in English terminology) alert system in particular are automatic notifications of occurrence of feared events in an aircraft. These messages, as well as similar messages as the case may be, thus are associated with the feared events in the graph of feared events. For these purposes, notification-type peaks are added to the graph of feared events and directed links are established between these new peaks and feared-events type peaks.

Figure 4:
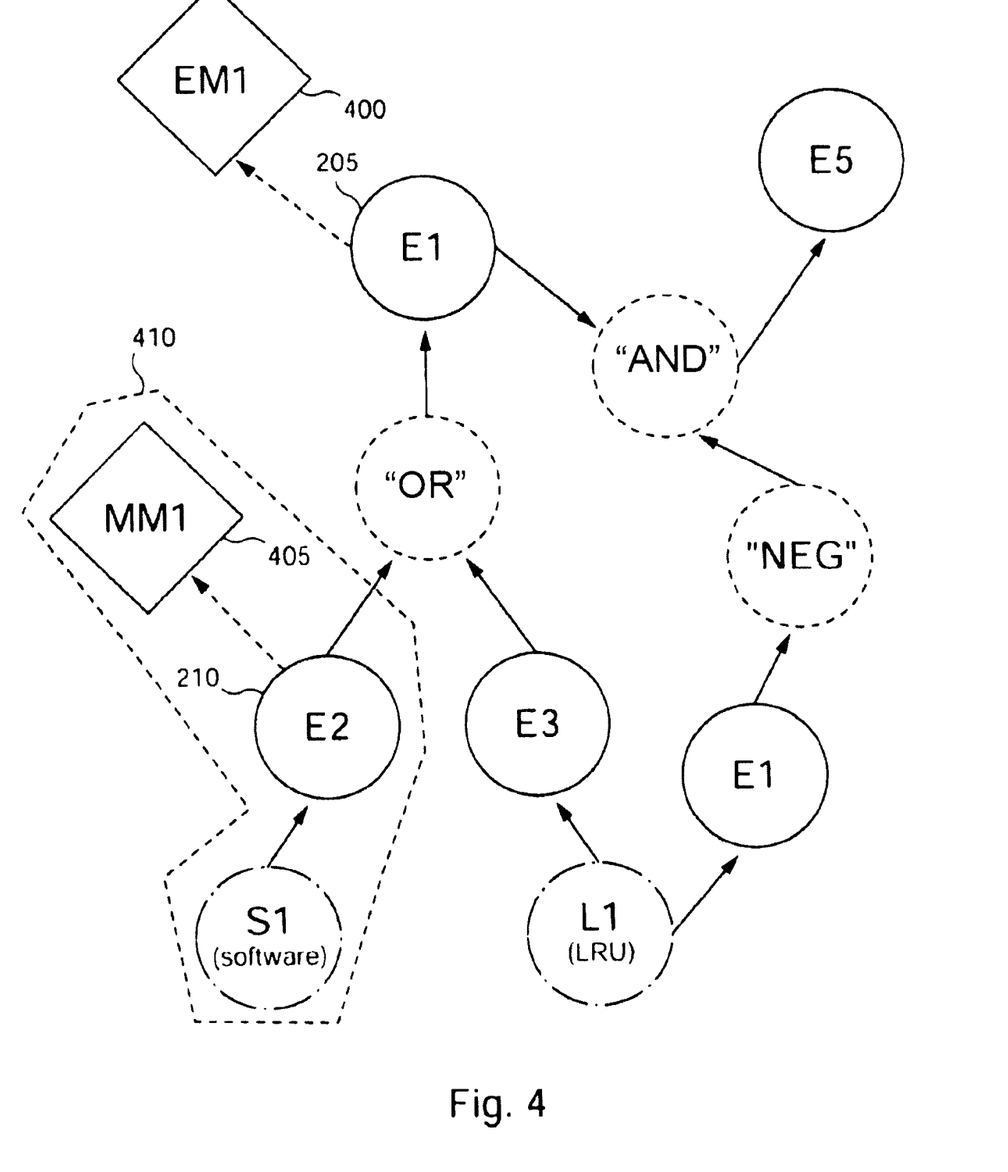
FIG. 4 shows the graph of feared events illustrated on FIG. 2 further comprising peaks associated with messages originating from monitoring systems of the system characterized by the graph of feared events.

Such a relationship may be established with the aid of a simple logic of the first order. In this way, for example, as illustrated on FIG. 4 representing a feared-event graph based on the one described with reference to FIG. 2, an EM1 message (ECAM-type message), here referenced 400, having the purpose of announcing the occurrence of a feared event E1

(205) may be represented on the graph of feared events by a notification-type peak, the latter being connected by an arc to the peak representing the feared event with which it is associated, that is to say here feared event E1 (205). Likewise, a maintenance message MM1 (405), having the purpose of announcing the occurrence of a feared event E2 (210), here is represented on the graph of feared events by a peak and linked to the peak representing the corresponding feared event.

It is seen here that a detected event, notified by a message, corresponds to a specific instantiation, in time, of a feared event or of a conjunction of feared events. Thus, although for the sake of clarity the graph of feared events here comprises notification-type peaks, feared events from the graph of feared events may be obtained directly from a notification message without its being necessary to use notification-type peaks in the graph of feared events.

By way of illustration, a monitoring unit (BITE) detecting that a hydraulic fluid pressure value is below 345 bars and transmitting a corresponding message is a means for notifying occurrence of the feared event of "Hydraulic pressure too low" type. In this way a link may be established between this message and this feared event. Likewise, a monitoring unit detecting that a pressure of a hydraulic accumulator for a brake is lower than 8 bars is another means for notifying the feared event of "Hydraulic pressure too low in the accumulator for the braking function" type.

In other words, this phase makes it possible to introduce a knowledge linked to the messages of monitoring systems in the graph of feared events modeled beforehand.

This phase makes it possible in particular to bring together, according to the same formalism, in connection with corresponding feared events, maintenance messages, messages of the FWS, in particular ECAM-type messages and alerts, ACMF monitoring parameters as well as results of tests performed on the aircraft on the ground.

It also makes it possible to obtain a simple representation, on the basis of logic of the first order, of events detected in monitoring systems in a graph of feared events, easily understandable for non-expert users of the system considered. Moreover, it makes it possible to carry out formal proofs of the coverage and the diagnostic precision of the software programs of the monitoring systems (Built-In-Test) of these systems transmitting maintenance messages, by calculating the sub-graphs of feared events generated by the notification peaks and all the predecessors thereof (that is to say all the peaks of blamable-object type having a logic implication link to the notification-type peak considered). Thus, for example, the sub-graph referenced 410 on FIG. 4 represents the sub-graph generated by the peak corresponding to notification of message MM1 (405). A predecessor here is a blamable-object type peak connected to a notification-type peak via at least one feared-event type peak, the predecessor being able to be regarded as a cause (determined by the direction of the linking between the two peaks).

The independence between the software programs of the monitoring systems (Built-In Test) provided by the various parts suppliers is assured by virtue of the use of interface-type feared events nodes in the model. These nodes facilitate and formalize the specification of the interfaces between systems. Moreover, this representation allows an automatic analysis of the consequences, in the same system or in others, of a modification of an equipment item of the aircraft, in its functionalities or its failure modes. Such an analysis may be carried out with the aid of an algorithm gradually automatically reestablishing the graph, and listing the feared events that may be generated by this equipment modification.

This phase also allows a manufacturer to define coverage objectives for the failure management procedure (also called trouble-shooting in English terminology) to be implemented with each maintenance message. Finally, it may be used as a reasoning model for failure management of the ground because it represents all the branches of possible malfunctions that may lead to a feared event notified in flight.

When relationships between the messages of feared-event type linked to events detected in monitoring systems and peaks of the graph of feared events have been established, the messages linked to events detected in monitoring systems may be obtained (phase 110 of FIG. 1) in real time or in batch mode, to be processed. These messages in particular may be obtained on board an aircraft via a centralized maintenance system (CMS) or on the ground by collecting messages regularly transmitted by the aircraft, for example messages of AGARS (acronym for Aircraft Communication Addressing and Reporting System in English terminology) type.

A following phase (phase 115 of FIG. 1) advantageously implemented in an automatic machine, consists in particular in using the graph of feared events (static and a priori knowledge) and notifications of the monitoring systems (dynamic knowledge collected in real time) for implementing an aid in diagnosis of the system corresponding to the graph of feared events at a given moment.

For these purposes, the graph of feared events makes it possible to establish causality links between feared events the corresponding notifications of which have been received and to isolate the feared events from the others at the source of propagation. This graph moreover makes to possible to infer therefrom an aid for diagnosis through suspicion of a minimal number of blamable objects by calculating the set of minimal vertexes (or hitting sets in English terminology), that is to say the sufficient set of configurations of blamable objects having been able to lead to each feared event considered.

Figure 5:
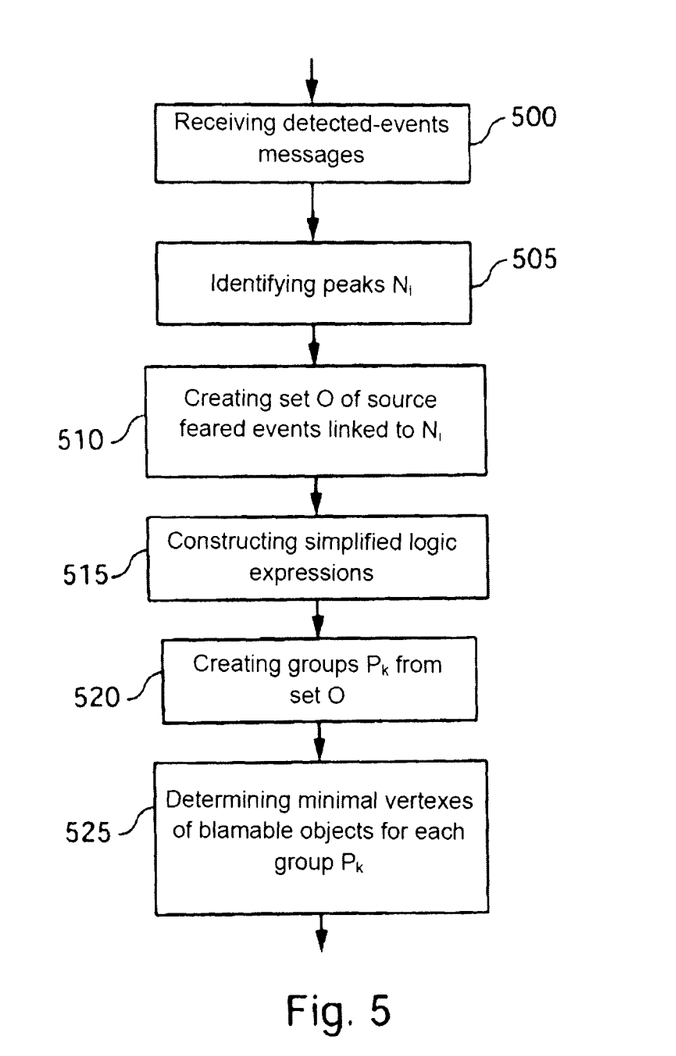
FIG. 5 illustrates an exemplary algorithm for aid in diagnosis of an aircraft system from notifications received from monitoring systems and from a graph of feared events.

FIG. 5 illustrates an exemplary algorithm for aid in diagnosis from notifications received from monitoring systems and from a graph of feared events such as described above.

After at least one notification has been received from a monitoring system (step 500), the corresponding notification-type peak or peaks $N_i$ are identified (step 505), in the graph of feared events, according to the links established beforehand (phase 105 of FIG. 1).

In a following step (step 510), the identified notification-type peaks $N_i$ are used for searching the graph of feared events and selecting the set O of source feared events, that is to say feared events capable of triggering feared events directly linked to the identified notification-type peaks $N_i$. Each of the source feared events of set O is such that:

there is no feared event directly linked to the identified notification-type peaks $N_i$ from which it cannot be inferred; and, its occurrence time interval is included in the occurrence intervals for subsequent events.

In order to assure a causality relationship between events, an inclusion requirement between the times of occurrence of messages linked to the identified notifications preferably is implemented during creation of group O. According to this requirement, O is a sub-group $\{E_i\}_{i \in j}$ of $N_i$ such that for any element E' included in $N_i$ and any element $E_j$ included in O, either E' does not involve $E_j$ ($\neg (E' \Rightarrow E_j)$), or the occurrence interval of $E_j$ is not included in the occurrence interval of $$E' \left\{ \begin{pmatrix} I_{E_j} \not\subset I_E \\ \text{and} \\ I_{E_j} \neq I_{E'} \end{pmatrix} \right.$$

In a following step (step 515), the algorithm searches the sub-graph of previous peaks of each source feared event of set O. The algorithm reestablishes the sub-graph up to the blamable objects and, in its search, applies the logic gates of the graph of feared events in order to construct the simplified logic expression created from blamable objects and logic operators AND, OR or NEG. This expression constitutes the logic explanation of the source feared event considered. For these purposes, the logic predicate Ab(•) is introduced (Ab meaning abnormal in English terminology). It represents the logic function making it possible to suspect a blamable object. Thus, for example, Ab(Actuator) means that the actuator is suspected of being out of order. By way of illustration and as illustrated on FIG. 6a, feared event E1 is explained by the logic expression:
    Ab(AccObj$_5$) OR Ab(AccObj$_7$)
feared event E2 is explained by the logic expression:
    Ab(AccObj$_7$) OR Ab(AccObj$_1$)
feared event E3 is explained by the logic expression:
    Ab(AccObj$_1$) OR Ab(AccObj$_4$)

In a following step (step 520), the source feared events are brought together in the following manner: two feared events $E_i$ and $E_k$ are brought together in the same set $P_j$ if their associated logic explanations (determined previously) comprise at least one common blamable object operand.

Figure 6A:
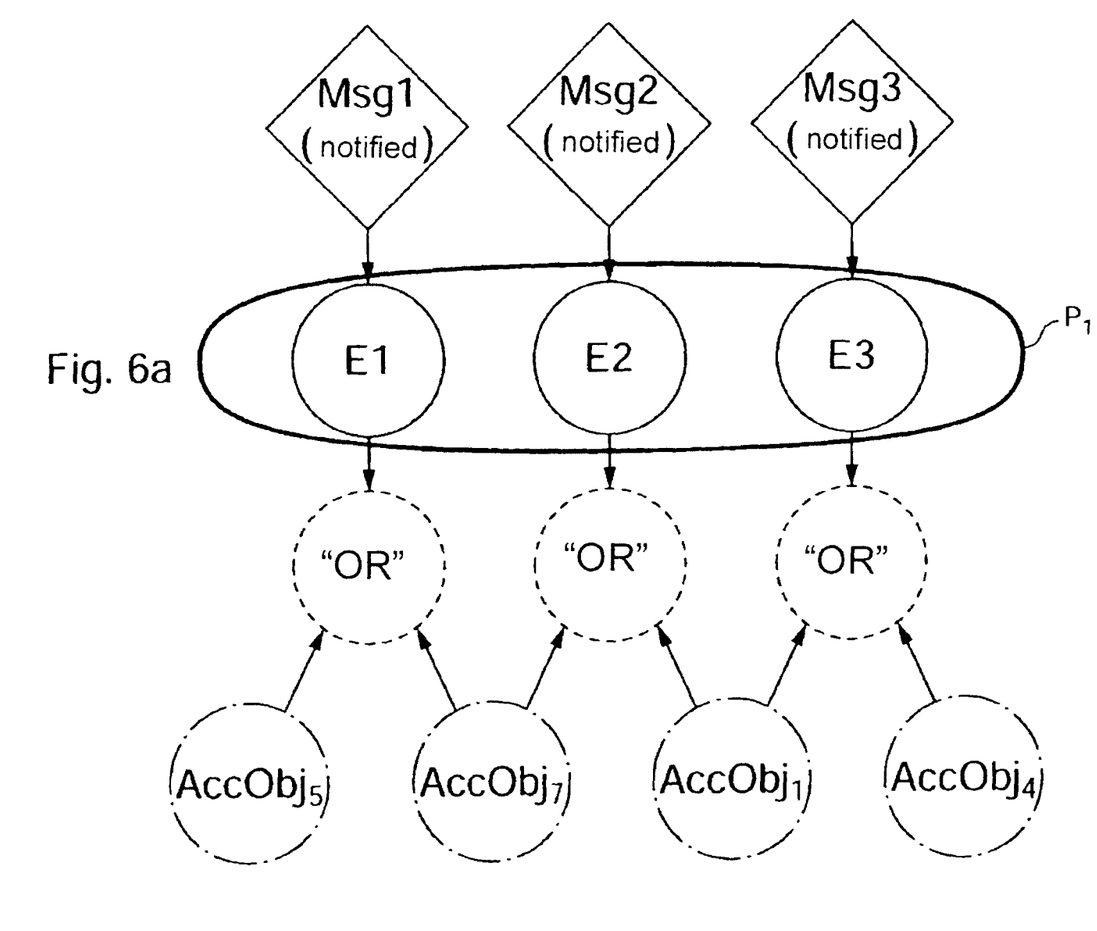
FIGS. 6a and 6b, illustrates certain steps of the algorithm described with reference to FIG. 5.

Taking up the preceding example based on FIG. 6a, events E1, E2 and E3 (regarded as source feared events) are brought together in the same set P1={E1, E2, E3} because the logic expressions explaining source feared events E1 and E2 comprise the same operand Ab(AccObj$_7$) and the logic expressions explaining source feared events E2 and E3 comprise the same operand Ab(AccObj$_1$).

In this way, two groups $P_j$ and $P_k$ constitute two groups of separate sources and make it possible to isolate separate sets of suspected blamable objects: by considering the set of blamable objects suspected through $P_j$ and that of blamable objects suspected through $P_k$, these sets are not connected. Each group $P_k$ expresses the presence of a problem the diagnosis of which will be formulated from blamable objects that may be inferred from the group.

In a following step (step 525), the minimal vertexes (minimal hitting sets) of blamable objects covering each source feared event $E_i$ of each set $P_k$ are calculated.

A vertex of set $F_j$ of blamable objects covering a given feared event is defined here as a conjunction of predicates on these blamable objects which is coherent with the logic expression associated with this feared event $E_i$.

Thus, by way of illustration and with reference to FIG. 3, the logic expression Ab(Actuator) AND Ab(Feeder), associated with the feared event "Malfunctioning of the control" is coherent with the logic expression Ab(Actuator) OR Ab(Feeder) OR Ab(Cut-out switch) OR Ab(Supply bar).

A minimal vertex here is defined in the following manner: in a vertex set {$V_n$}, a vertex $V_m \in \{V_n\}$ is referred to as minimal if there is no other {$V_n$} vertex that may be inferred logically from $V_m$.

Thus, for example, the vertex Ab(Actuator) is inferred from the vertex Ab(Actuator) AND Ab(Feeder). Consequently, the vertex Ab(Actuator) AND Ab(Feeder) is not a minimal vertex of a set that might contain these two vertexes.

These minimal vertexes here represent the minimal diagnoses for each problem k linked to a group $P_k$. In other words, the minimal vertexes of a group $P_k$ are the minimal logic expressions of blamable objects able to explain all the feared events of group $P_k$. According to the example given above with reference to FIG. 6a and illustrated on FIG. 6b, the minimal vertexes $V_r$ are, for the group $P_1$={E$_1$, E$_2$, E$_3$}, the following logic expressions of blamable objects, V1: Ab(AccObj$_1$) AND Ab(AccObj$_7$)
V2: Ab(AccObj$_1$) AND Ab(AccObj$_5$)
V3: Ab(AccObj$_4$) AND Ab(AccObj$_7$)

Figure 6B:
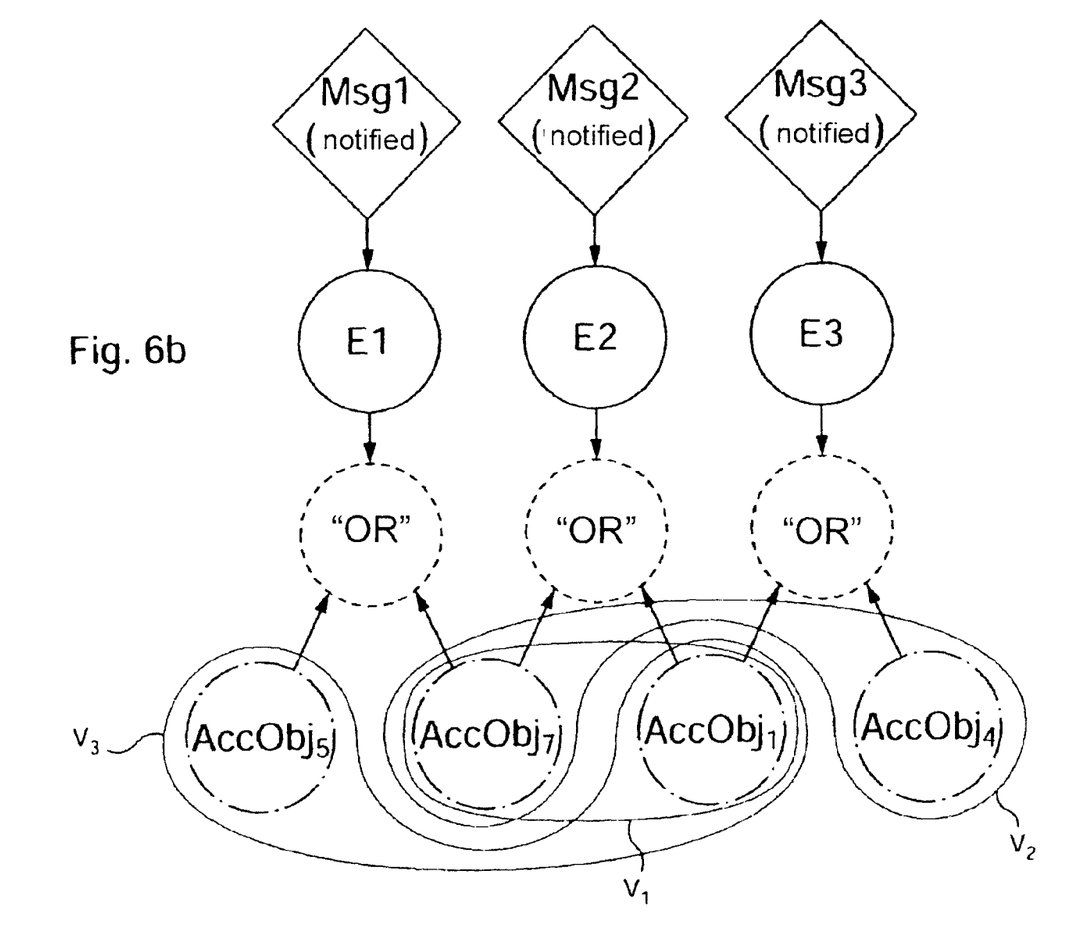

By way of illustration, the vertex V4 (Ab(AccObj$_1$) AND Ab(AccObj$_7$) AND Ab(AccObj$_4$)) is not a minimal vertex of the group $P_1$ because the minimal vertex V1 (Ab(AccObj$_1$) AND Ab(AccObj$_7$)) are inferred therefrom.

The minimal vertexes of blamable objects of each group $P_k$ then may be brought together to represent all the blamable objects making it possible to explain all the feared events identified through the messages of notifications of detected events.

The use of a graph of feared events in a system for aid in diagnosis makes it possible to increase the level of precision of the diagnosis through the possibility of performing cross-checks by minimal vertexes (minimal hitting sets), which makes it possible to optimize failure management procedures on the ground in terms of time and consequently to reduce maintenance costs.

In addition, the completeness level of the final diagnosis is enhanced. In fact, the diagnosis is expressed starting from blamable objects of the graph of feared events. By virtue of construction thereof, these cover all the known origins able to explain subsequent failures: replaceable equipment items (LRU), software programs (Software), cables or operating conditions such as a resetting (reset) of an equipment item or exceptional operating conditions.

Moreover, the relationships established between a diagnosis and messages or alerts notified, able to be consulted on the graph of feared events, may be used during on-line maintenance operations for an aircraft on stopover to determine causes linked to a specific symptom (ECAM-type messages, alerts, etc.) noted by the pilot in a flight report called logbook in English terminology. By using the graph of feared events, the system for aid in diagnosis does not make any correlation relationship between failures and symptoms, but establishes causality relationships coherent with safety analyses, able to be used in particular for investigations, especially in the context of accidents.

Moreover, combined with a diagnosis result, the graph of feared events may be used in a failure management procedure. In fact, such a procedure typically consists in testing the lower branches of the graph, linked to the blamable objects, on which there are misgivings about failures, because the set of notified information items has not been sufficient to remove these misgivings. In order to remove ambiguities, the failure management procedure may rely on the graph so as to define the areas of misgiving, then turn to new types of notifications provided by ACMF parameters or results of avionic tests.

According to a first embodiment, the system for aid in diagnosis is implemented in an on-board maintenance system of an aircraft. The notifications received by the system for aid in diagnosis preferably are failure reports of the ARINC 624 type sent by the systems of the aircraft, notifications of ECAM-type messages, messages of availability and/or of alerts transmitted by the FWS. The algorithm described with reference to FIG. 5 then is run periodically or upon reception of a new notification. The graph of feared events used preferably corresponds to the concatenation of the graphs of feared events of the systems of the aircraft according to the actual configuration thereof, in particular taking into account optional equipment items installed.

The version of the graph of feared events carried on board an aircraft may be a simplified version without certain branches, which nonetheless makes it possible to obtain an initial diagnosis result putting the maintenance operator on the right track. In a second embodiment, a complete version of the graph of feared events may be used, for example in order to allow an aircraft manufacturer to sell a detailed diagnosis service to an airline company.

The results of aid in diagnosis advantageously are stored aboard the aircraft. They then may be displayed via a man-machine interface. They also may be sent to an data processing system on the ground via a communication system (for example the ACARS system).

Figure 7:
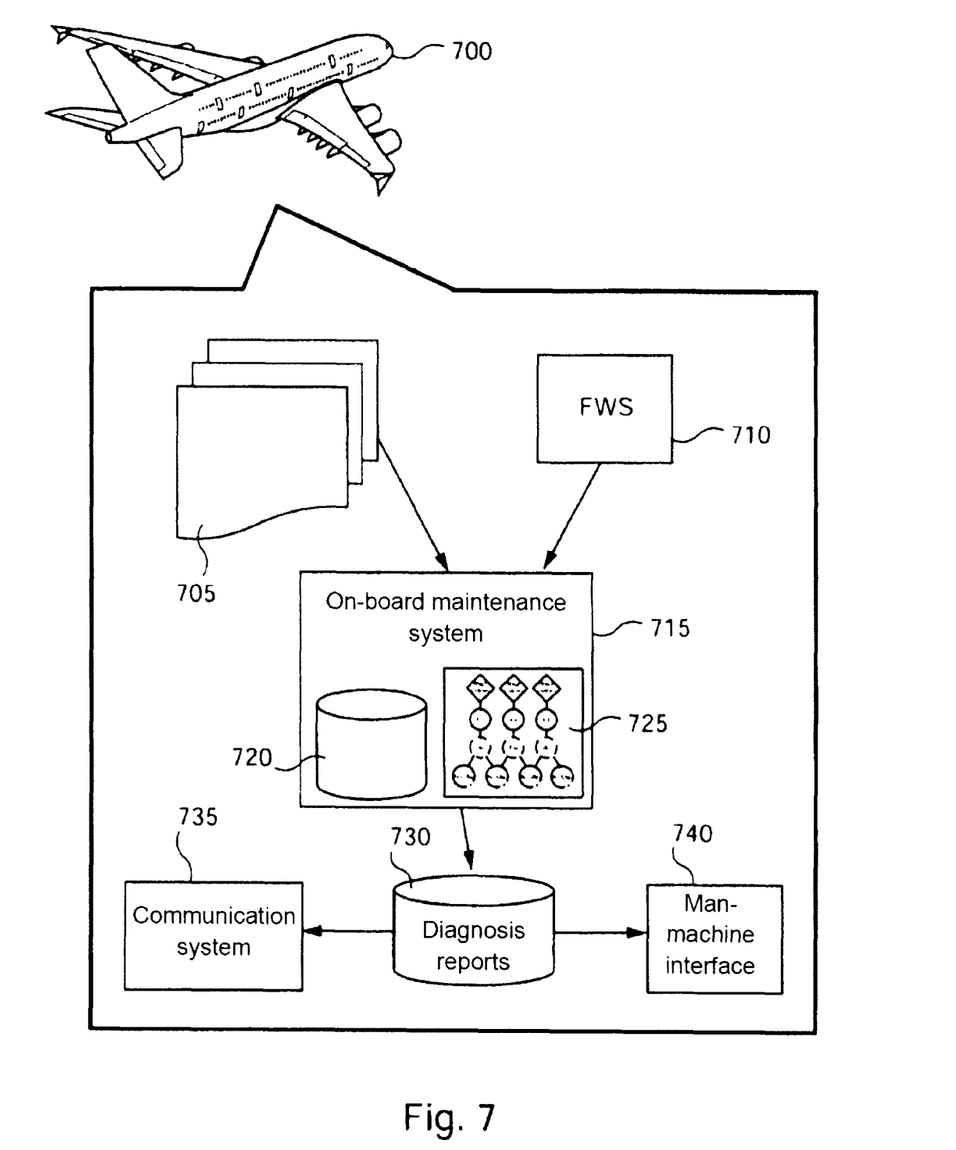
FIGS. 7 and 8 illustrate two embodiments of the invention.

FIG. 7 illustrates such an embodiment implemented in an aircraft 700 comprising a set of systems, generically referenced 705, each provided with a BITE-type monitoring system and an FWS alert system 710. The monitoring systems as well as the alert system transmit messages of notification of detected events to an on-board maintenance system 715. On-board maintenance system 715 comprises a knowledge base 720 comprising in particular at least one graph of feared events 725 linked to a system of the aircraft. This graph of feared events is used in combination with the notification messages received in order to establish an aid in diagnosis in accordance with the invention using, for example, the algorithm described with reference to FIG. 5. The result of such an aid in diagnosis, comprising a set of minimal vertexes representing minimal diagnoses, is stored in report form in a database 730 to be transmitted, via communication means 735, for example an ACARS system, to a data processing system on the ground (not shown) and/or to be consulted via a man-machine interface 735.

Such a system allows a small latency between the notifications from the monitored systems and the running of the algorithm for aid in diagnosis. Moreover, the availability, in real time, of the aid-in-diagnosis results on board the aircraft imparts thereto an autonomy of diagnosis.

According to another embodiment, the algorithm for aid in diagnosis is run by a data processing system on the ground from data transmitted by an aircraft. The algorithm for aid in diagnosis may be run by the manufacturer of the aircraft which, preferably, centralizes and validates the aid-in-diagnosis results for several aircraft, these results being able to be validated by experts. The results, comprising a set of minimal vertexes representing minimal diagnoses, then may be transmitted to the airline companies operating the aircraft via a communication network such as Internet. Alternatively or additionally, the algorithm for aid in diagnosis may be implemented within an airline company operating aircraft, the algorithm for aid in diagnosis being able to be supplied by the aircraft manufacturer in the form of software applications. The latter may be carried out with an architecture having open and modular interfaces, allowing integration thereof with other management services for a fleet of aircraft.

Figure 8:
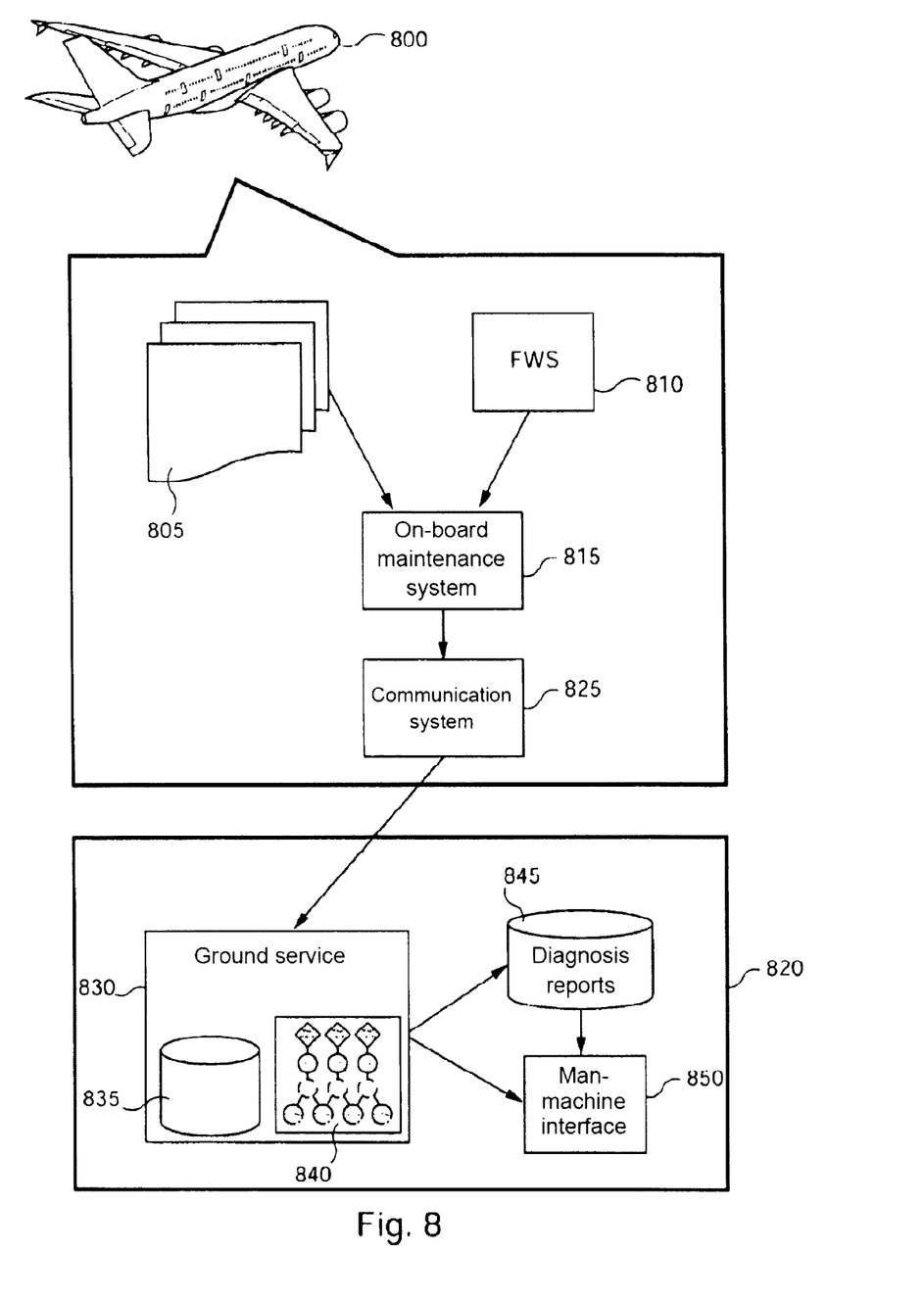

FIG. 8 illustrates such an embodiment implemented for data originating from an aircraft 800 comprising a set of systems, generically referenced 805, each provided with a BITE-type monitoring system and an FWS alert system 810. The monitoring systems as well as the alert system transmit messages of notification of detected events to an on-board maintenance system 815. On-board maintenance system 815 can transmit notification messages received from monitoring systems 805 and from alert system 810, processed or not, combined or not, to a data processing system 820 on the ground, via communication means 825, for example an ACARS system.

Data processing system 820 comprises a knowledge base 830 comprising in particular at least one graph of feared events 835 linked to a system of the aircraft considered. This graph of feared events is used in combination with the received notification messages in order to establish a diagnosis aid in accordance with the invention for example by implementing the algorithm described with reference to FIG. 5. A result of such an aid in diagnosis, comprising a set of minimal vertexes representing minimal diagnoses, is stored in report form in a database 845. It may be consulted via a man-machine interface after it has been produced or after it has been stored.

Such an embodiment makes it possible to implement a centralized system for aid in diagnosis on the ground, which may be used to establish an aid in diagnosis for several aircraft. Moreover, the system for aid in diagnosis may be integrated, for example, into another maintenance information system having the purpose of programming maintenance tasks and managing spare parts logistics. The use of such an embodiment makes it possible to considerably reduce the time necessary for establishment of a diagnosis. Thus, it is seen that combined with a failure management procedure, the time saving may reach a factor 50.

Figure 9:
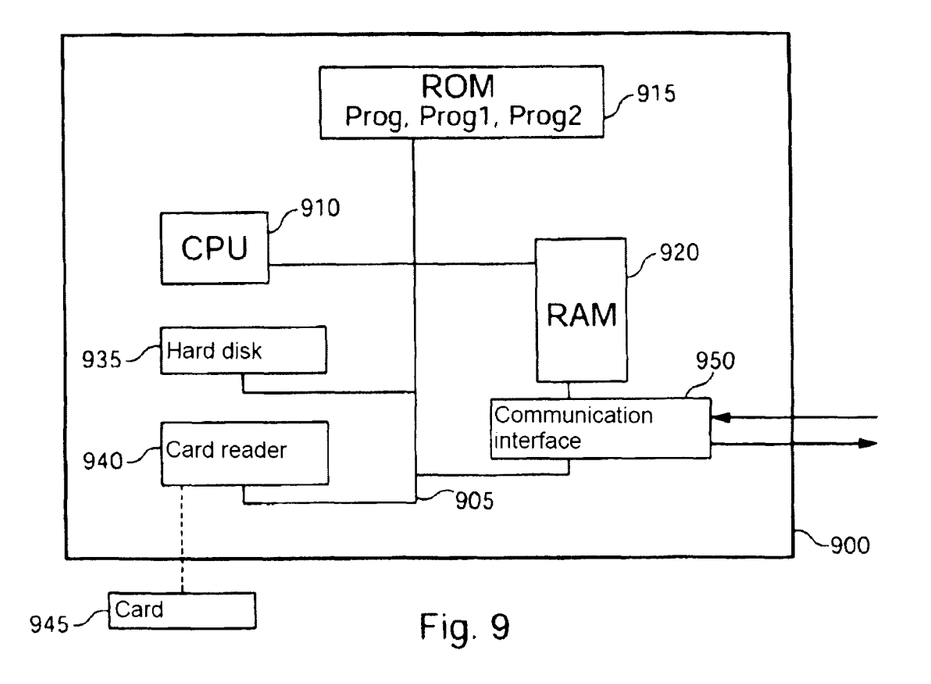
FIG. 9 illustrates an exemplary hardware architecture adapted for implementing certain steps of the invention.

FIG. 9 illustrates an exemplary hardware architecture of a device 900 adapted for implementing certain steps of the invention, in particular the steps described with reference to FIG. 5. Device 900 is, for example, a computer or a data-processing machine. It here comprises a communication bus 905 to which there are connected:
- one or more central processing units or microprocessors 910 (CPU);
- a read-only memory 915 (ROM, acronym for Read Only Memory in English terminology) that can comprise programs (prog, prog1 and prog2) necessary for implementation of the invention;
- a random access or cache memory 920 (RAM, acronym for Random Access Memory in English terminology) comprising registers adapted for recording variables and parameters created and modified in the course of running the aforesaid programs; and
- a communication interface 950 adapted for transmitting and receiving data.

Device 900 also preferably has a hard disk 935 that can comprise the aforesaid programs as well as information items processed or to be processed according to the invention and a memory card reader 940 adapted for receiving a memory card 945 and reading or writing therein data processed or to be processed according to the invention.

The communication bus permits communication and interoperability among the various components included in device 900 or connected thereto. The depiction of the bus is not limitative and, in particular, the central unit is able to communicate instructions to any component of device 900 directly or via another component of device 900.

The executable code of each program permitting the programmable device to implement the processes according to the invention may be stored, for example, on hard disk 935 or in read-only memory 915.

According to a variant, memory card 945 may contain information items, in particular information items to be processed according to the invention, as well as the executable code of the aforesaid programs which, once read by device 900, is stored on hard disk 935.

According to another variant, the executable codes of the programs and the information items to be processed according to the invention will be able to be received, at least partially, via interface 950, to be stored in a manner identical to that described above.

More generally, the program or programs as well as the information items to be processed according to the invention will be able to be loaded into one of the storage means of device 900 before being run.

Central unit 910 is going to control and direct the running of the instructions or portions of software code of the program or programs according to the invention, which instructions are stored on hard disk 935 or in read-only memory 915 or else in the other aforesaid storage components. During boot-up, the program or programs that are stored in a non-volatile memory, for example hard disk 935 or read-only memory 915, are transferred into random access memory 920 which then contains the executable code of the program or programs according to the invention, as well as the registers for storing the variables and parameters necessary for implementation of the invention.

Naturally, to satisfy specific needs, an individual competent in the field of the invention will be able to apply modification in the foregoing description.

The invention claimed is:

1. A method for establishing an aid in diagnosis of a complex system of an aircraft comprising a plurality of sub-systems, at least one sub-system of the plurality of sub-systems comprising circuitry configured to monitor and provide notifications regarding at least one detected event,
   the method using:
     a failure condition graph at least partially modeling the complex system, the failure condition graph comprising a plurality of peaks, each peak being connected by a logic implication relationship to at least one other peak of the plurality of peaks, the plurality of peaks comprising:
       one peak representing a failure condition event; and
       one peak representing only at least one element of the complex system, the at least one element being able to break down, and
   the method comprising:
     receiving at least one message of notification of occurrence of the at least one detected event;
     creating a set of failure events, each said failure event of the set of failure events being associated with a peak of the failure condition graph linked to the at least one received notification message;
     for each said failure event of the set of failure events, constructing, from the failure condition graph, at least one logic expression leading to the failure event, the at least one logic expression being based on elements of the complex system;
     creating at least one group of failure events of the set of failure events, the at least one element being common to two logic expressions linked to two separate failure events of the at least one group, the logic expressions associated with the failure events of the at least one group representing a diagnosis relating to the at least one detected event; and
     determining minimal vertexes of the logic expressions of the failure events of the at least one group of failure events, the minimal vertexes forming minimal diagnoses of the diagnosis relating to the at least one detected event.

2. The method according to claim 1,
   wherein the failure condition graph of failure events further comprises at least one peak representing a message associated with the at least one detected event, and
   wherein the method further comprises identifying, in the failure condition graph, at least one peak representing a message according to the at least one received message, each said failure event of the set of failure events being associated with a peak of the failure condition graph linked to the at least one notification message via the at least one identified peak.

3. The method according to claim 1, further comprising performing at least one of displaying, storing, and transmitting the diagnosis relating to the at least one detected event.

4. The method according to claim 1, wherein the failure condition graph further comprises at least one sub-graph of failure events, the at least one sub-graph of failure events at least partially modeling one of the sub-systems of the plurality of sub-systems.

5. The method according to claim 1, wherein the failure condition graph further comprises at least one peak representing a logic operation, at least one of the logic expressions comprising a logic operation represented by a peak of the failure condition graph.

6. A non-transitory computer-readable storage medium storing computer-readable instructions that, when executed by a computer, cause the computer to perform the method according to claim 1.

7. A maintenance system for an aircraft comprising processing circuitry configured to perform the method according to claim 1.

8. The maintenance system according to claim 7, further comprising transmitting circuitry configured to transmit the diagnosis to a system distant from the maintenance system.

9. The maintenance system according to claim 7 or claim 8 configured to operate with an aircraft.

10. A data processing system comprising:
    circuitry configured to receive information items relating to at least one message of notification of occurrence of at least one event detected by monitoring and notification circuitry of a sub-system of a complex system of an aircraft comprising a plurality of sub-systems; and
    processing circuitry configured to perform the method of claim 1.

11. The method according to claim 1, wherein the one peak representing the failure condition event represents an interface between two of the plurality of sub-systems.

12. The method according to claim 1, wherein the one peak representing only the at least one element of the complex system that is able to break down is associated with a triggering of the failure condition event.

13. The method according to claim 1, wherein said receiving the at least one message includes receiving a plurality of messages according to a batch mode.

14. The method according to claim 1,
    wherein the failure condition graph includes a plurality of peaks representing only at least one element of the complex system that are able to break down, each of said plurality of peaks representing different elements of the complex system that are able to break down,
    wherein the diagnosis is expressed by the failure condition graph in terms of starting from said plurality of peaks representing different elements of the complex system that are able to break down, and
    wherein the method further comprises determining a minimal vertex of regarding said plurality of peaks representing different elements of the complex system that are able to break down.

15. A method for establishing an aid in diagnosis of a complex system of an aircraft comprising a plurality of sub-systems, at least one sub-system of the plurality of sub-systems comprising circuitry configured to monitor and provide notifications regarding at least one detected event, the method using:
a failure condition graph at least partially modeling the complex system, the failure condition graph comprising a plurality of peaks, each peak being connected by a logic implication relationship to at least one other peak of the plurality of peaks, the plurality of peaks comprising:
one peak representing a failure condition event; and
one peak representing only at least one element of the complex system, the at least one element being able to break down, and the method comprising:
receiving at least one message of notification of occurrence of the at least one detected event;
creating a set of failure events, each said failure event of the set of failure events being associated with a peak of the failure condition graph linked to the at least one received notification message;
for each said failure event of the set of failure events, constructing, from the failure condition graph, at least one logic expression leading to the failure event, the at least one logic expression being based on elements of the complex system; and
creating at least one group of failure events of the set of failure events, the at least one element being common to two logic expressions linked to two separate failure events of the at least one group, the logic expressions associated with the failure events of the at least one group representing a diagnosis relating to the at least one detected event,
wherein the failure condition graph includes a plurality of peaks representing only at least one element of the complex system that are able to break down, each of said plurality of peaks representing different elements of the complex system that are able to break down,
wherein the diagnosis is expressed by the failure condition graph in terms of starting from said plurality of peaks representing different elements of the complex system that are able to break down, and
wherein the method further comprises determining a minimal vertex of regarding said plurality of peaks representing different elements of the complex system that are able to break down.

16. The method according to claim 15,
wherein the failure condition graph of failure events further comprises at least one peak representing a message associated with the at least one detected event, and
wherein the method further comprises identifying, in the failure condition graph, at least one peak representing a message according to the at least one received message, each said failure event of the set of failure events being associated with a peak of the failure condition graph linked to the at least one notification message via the at least one identified peak.

17. The method according to claim 15, wherein the failure condition graph further comprises at least one peak representing a logic operation, at least one of the logic expressions comprising a logic operation represented by a peak of the failure condition graph.

18. The method according to claim 15, wherein the one peak representing the failure condition event represents an interface between two of the plurality of sub-systems.

19. A non-transitory computer-readable storage medium storing computer-readable instructions that, when executed by a computer, cause the computer to perform the method according to claim 15.

* * * * *